United States Patent Office 3,467,628
Patented Sept. 16, 1969

3,467,628
METHOD OF INCREASING THE MOLECULAR WEIGHT OF OLEFIN POLYMERS BY USE OF A POLYISOCYANATE MODIFYING AGENT
Robert Dean Thurn, Wilmington, Del., assignor to E. I. du Pont de Nemours and Company, Wilmington, Del., a corporation of Delaware
No Drawing. Filed Sept. 28, 1966, Ser. No. 582,500
Int. Cl. C08f 27/10
U.S. Cl. 260—77.5    4 Claims

ABSTRACT OF THE DISCLOSURE

A method of increasing the molecular weight of polymers of α-olefins made with soluble vanadium or titanium coordination catalysts by adding, during the synthesis of the polymer, an organic polyisocyanate in an amount sufficient to supply from 20 to 60 parts by weight of isocyanate groups for each gram atom of titanium or vanadium present in the polymerization vessel prior to terminating the polymerization reaction by addition of a Zerewitinoff-active hydrogen compound. Improved green strength results and a post-synthesis treatment step is avoided.

---

The polymerization of a wide variety of unsaturated hydrocarbon compounds with coordination catalysts is known. In particular it has been found that soluble coordination catalysts tend to produce sterically irregular polymers, generally called atactic polymers, of the higher-α-olefins and are beneficial in producing elastomeric copolymers of differing α-olefins such as ethylene/propylene copolymers. Other useful copolymers can be made by incorporating a cure-site monomer in the elastomeric copolymers. Such cure-site monomers are generally dienes having at least one and preferably only one readily polymerizable double bond, which provides a means to incorporate the monomer into the molecule, and a second double bond which becomes available for cross linking reactions such as those provided by conventional sulfur-curing formulations.

The hydrocarbon polymers thus obtained are typified by a saturated backbone chain and are essentially linear in that branches from the main chain arise from the monomers and not from the polymerization process.

In many instances the elastomeric copolymers are deficient in green strength, prior to cure, and compounding with curing agents and the like is thus difficult on conventional rubber milling equipment.

It has been known that green strength of the synthetic hydrocarbon elastomers can be improved by post-synthesis treatment which is essentially a partial cross-linking of the polymers. Such processes add greatly to the manufacturing costs of the polymers, and it would be desirable to modify the polymers during the synthesis.

Accordingly the present invention is directed to a process for modifying the molecular weight of polymers of α-olefins during the synthesis. This process may be defined as follows:

In a process for making hydrocarbon polymers of monomers comprising α-olefins having from 2 to 18 carbon atoms by contacting and polymerizing the monomers in a polymerization vessel with an organo-soluble coordination catalyst comprising the reaction product of a hydrocarbon soluble vanadium or titanium compound and an organometallic reducing agent dissolved in an organic solvent selected from liquid hydrocarbons and liquid halogenated hydrocarbons, and terminating the polymerization reaction by adding to the polymerization vessel at least one equivalent of a Zerewitinoff-active hydrogen compound for each equivalent of the vanadium or titanium compound and for each equivalent of the organometallic reducing agent and recovering a normally solid hydrocarbon polymer from the reaction medium the improvement which consists of adding, prior to the addition of the Zerewitinoff-active hydrogen compound, an organic polyisocyanate in an amount sufficient to supply from 20 to 60 parts by weight of isocyanate groups for each gram atom of titanium or vanadium present in the polymerization vessel.

The polymerization of olefins to form elastomers and thermoplastics with soluble coordination catalysts is well known. In general, coordination catalysts consist of a transition metal compound which is reacted with an organometallic reducing agent, preferably an organoaluminum compound. Soluble coordination catalysts generally require the use of a hydrocarbon-soluble transition metal compound which is preferably reduced by the organometallic reducing agent in the presence of the polymerizable monomers. The preferred transition metal compounds for the formation of soluble catalysts are hydrocarbon soluble vanadium compounds. Preferably either the transition metal compound or the organometallic reducing agent contains a halogen such as chlorine. Examples of soluble coordination catalysts are titanium tetrachloride reduced with lithium aluminum tetraalkyls; vanadium tetrachloride or vanadium oxytrichloride reduced with a dialkyl aluminum halide such as diisobutyl aluminum chloride or a trialkyl aluminum compound; and ortho vanadate esters reduced with dialkyl aluminum halides.

The monoolefins which can be employed for the formation of polymer are aliphatic α-monoolefins having from 2 to 18 carbon atoms, and are preferably straight chain compounds. The preferred members of this series are ethylene, propylene and 1-butene, which are available on a large scale and are less costly than the higher α-olefins. Compositions containing ethylene copolymerized with about an equal weight percentage of propylene are particularly valuable as elastomers. In making such copolymers due account should be taken of the differing reactivity of ethylene and propylene, which is well known in the art. The α-olefins described hereinabove are generally the major component of the polymer.

Other monomers can be copolymerized with the above α-olefins and mixtures thereof. For example, sulfur curability can be imparted by the incorporation of minor amounts of non-conjugated dienes into the polymers. Preferably the dienes contain only one double bond which can be polymerized with a coordination catalyst. Examples of such dienes are non-conjugated aliphatic dienes containing from 6 to 22 atoms having one double bond which has at least two hydrocarbon radicals attached to the unsaturated carbon atoms and a terminal double bond having one hydrocarbon radical attached to an unsaturated carbon atom. A preferred example is 1,4-hexadiene. Other suitable unsaturated compounds for imparting sulfur curability are 2-ethyl-norbornadiene, 5-methylene norbornene, 5-alkenyl-norbornene, dicyclopentadiene, 1,5-cyclooctadiene and the like. The use of these compounds in the manufacture of copolymer is further described in U.S. Patents 2,933,480; 3,063,973; 3,093,620; 3,260,708 and 3,093,621.

Norbornene may also be used as a co-monomer in place of part of the α-olefin.

Examples of polymers made with the above olefins are ethylene/propylene copolymers,
ethylene/propylene/butene-1 copolymers,
ethylene/propylene/1,4-hexadiene copolymers,
ethylene/propylene/5-methylene-norbornene copolymers,
ethylene/propylene/dicyclopentadiene copolymers, ethylene/norbornene/1,4-hexadiene copolymers,
ethylene/1,4-hexadiene copolymers,
propylene/hexene-1 copolymers, and the like.

The process is carried out in the presence of a suitable solvent for the catalyst, which is generally also a suitable solvent for the elastomeric copolymers which are the preferred products produced by the process of the present invention. Such solvents may be normally liquid hydrocarbons including aliphatic, alicyclic and aromatic hydrocarbons and halogenated, preferably chlorinated, derivatives thereof. Pentane, hexane, decane, hexadecane, diesel oil, cyclohexane, benzene, toluene, xylene, tetrachloroethylene and monochlorobenzene are examples of such solvents.

The reaction is terminated by addition of an excess of Zerewitinoff-active hydrogen compound i.e. an amount sufficient to react with the metallic compounds present. Aliphatic alcohols such as methanol, ethanol, propanol, isopropanol, butanol and the like are suitable. Water or other Zerewitinoff-active hydrogen containing compounds can also be employed. In the process of the present invention, the Zerewitinoff-active hydrogen containing compound performs a somewhat different function to its function in the prior art processes, as described hereafter, nevertheless the same quantities of the same reagents employed to terminate coordination polymerization can be employed in the practice of the present invention.

The modifying agent employed is an organic polyisocyanate having at least two isocyanate groups attached to a carbon skeleton which can be aliphatic, alicyclic, aromatic or heterocyclic. Suitable organic polyisocyanates are described in U.S. Patent 3,108,976, U.S. Patent 3,203,-944, and Canadian Patent 698,636. The aromatic polyisocyanates are preferred since they are readily available and easier to handle than aliphatic or alicyclic isocyanates. The preferred isocyanate is tolylene diisocyanate.

The best results are obtained in the practice of this invention when pure isocyanates are employed. Preferably the isocyanate is added to the reaction mixture as a solution in a suitable organic solvent which does not react with the isocyanate or with the polymerization catalyst. The solvents employed for the polymerization process can also be employed to dissolve the isocyanates.

The effect of adding an organic polyisocyanate to the polymerization reaction prior to short stopping the reaction with a Zerewitinoff-active hydrogen compound is to increase the molecular weight. It is believed that polymer molecules attached to active catalyst react with each isocyanate group to form a polymer/isocyanate/transition metal complex which is subsequently decomposed by the Zerewitinoff-active hydrogen short-stopping additive to form an amide linkage. The molecules are then joined by amide bridges. The theoretical requirement of isocyanate is therefore an amount sufficient to supply an equivalent of isocyanate group for each gram atom of the transition metal attached to a growing polymer chain. This quantity is however difficult to determine and it has been found that in general an amount of isocyanate sufficient to supply from 20 to 60 parts by weight of isocyanate groups for each gram atom of the vanadium or titanium transition metal present gives good results.

The polymerization process may be carried out batchwise or in a continuous reactor. In the latter case the organic polyisocyanate solution is added to the exit stream and mixed therewith prior to the Zerewitinoff-active hydrogen agent.

The products made according to the process of the present invention can be used for the same purposes as the corresponding products made without the organic isocyanate treatment. In the case of elastomeric copolymers, these may be compounded and cured by the methods conventional in the art.

This invention is further illustrated by the following examples which should not, however, be construed as limiting the scope of this invention.

EXAMPLE I

The following general procedure was used for the copolymers reported in Table I:

A one-liter resin flask was equipped with a stirrer, thermometer, a gas inlet tube, a rubber (serum) cap and a gas outlet tube. The resin flask, stirrer, gas inlet tube and gas outlet tube were dried in an oven at 65° C./105 mm. for at least thirty minutes before use. One-half liter of tetrachloroethylene which had been dried over silica gel and sparged with nitrogen was introduced into the resin flask during which time a stream of nitrogen at a flow rate of 0.5 liter/min. was allowed to pass through the resin kettle. The rapidly stirred tetrachloroethylene was then presaturated with nitrogen at a flow rate of 0.5 l./min. and ethylene and propylene at respective flow rates of 1 and 2 l./min., the feed stream being introduced below the surface of the solvent, the solvent being cooled by a bath of crushed solid carbon dioxide and acetone to 0° C. The flow of gases to the resin flask was then left unchanged throughout the subsequent polymerization. The ethylene, propylene and nitrogen were metered through separate rotameters, and combined at a three-way joint before being introduced into the resin flask. The ethylene and propylene were dried individually by passage through a two-foot high column of molecular sieve, Type 5A. After the tetrachloroethylene had been presaturated and cooled to the desired temperature, 3.8 ml. of 1,4-hexadiene was added. Polymerization was then initiated by introducing 5 ml. of a tetrachloroethylene solution 1.0 molar in diisobutylaluminum chloride, and 5 ml. of a 0.1 M benzene solution of vanadium tris(acetylacetonate), by means of hypodermic needles. When the reaction had continued for 13 minutes, 10 ml. of a 0.025 molar solution of 99% pure toluene 2,4-diisocyanate in tetrachloroethylene was added dropwise at a constant rate over a 2-minute period. Then, 10 ml. of a 1% solution of 4,4'-thiobis(2-tert-butyl-5-methyl phenol) in isopropyl alcohol was introduced. The feed stream was shut off, and the polymer solution washed in a Waring Blendor with 200 ml. of a 5% hydrochloric acid solution until the organic phase was colorless. The organic layer was separated and washed twice more with 200-ml. portions of water. The solvent was allowed to evaporate from the polymer solution in a porcelain pan. The copolymer A produced was obtained as a thin film which was dried at 60° C./105 mm. Hg for 24–36 hrs. at which time it gave a negative Beilstein test. A control was run without the isocyanate being added. The results are reported in Table I.

TABLE I

| | Wallace Plas. | $\eta$ Inh. | Yield, gms. | Weight percent $C_3H_6$ | Weight percent 1,4-hexadiene |
|---|---|---|---|---|---|
| Control | 26 | 1.75 | 13 | 51 | 3.6 |
| Copolymer A | 42 | 2.19 | 15 | 46 | 3.0 |

The Wallace Plasticity was measured by means of a Wallace Rapid Plastimeter. The method involves a preheating and preforming period lasting ten seconds in which a test piece is compressed to exactly 1 mm. in thickness and also heated to 100° C. During the second period, which lasts for exactly 15 sec., the test piece is subjected to a 10 kilogram load, causing it to flow and be reduced in thickness. The final thickness of the test piece expressed in units of 0.01 mm. is the plasticity reading.

Inherent viscosity was measured at 30° C., 0.1 gram of the copolymer sample in 100 ml. of tetrachloroethylene.

EXAMPLE II

A polymer sample B was prepared according to the general procedure described in Example I, having 62 mgs. of isocyanate having the formula

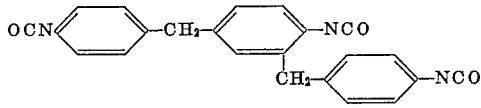

added after 12 min. of reaction time, the total reaction time, as before, being 15 min.

A control sample employing the same conditions but omitting the isocyanate was also run. The properties of those samples are shown in Table II.

TABLE II

| | Wallace Plas. | $\eta$ Inh. | Yield, gms. | Weight percent $C_3H_6$ | Weight percent 1,4-hexadiene |
|---|---|---|---|---|---|
| Control | 30.0 | 2.03 | 16.0 | 50 | 3.6 |
| Copolymer B | 47.7 | 2.53 | 15.0 | 49 | 2.9 |

EXAMPLE III

A series of polymer samples were prepared by the procedure described in Example I except that 8 ml. of a 1 molar solution of diisobutyl aluminum chloride and 8 ml. of an 0.1 molar solution of vanadium of tris(acetylacetonate) were used. During each reaction except the control approximately equal quantities of different isocyanates were injected two minutes before the alcohol was introduced.

TABLE III

| | Yield, gms. | Wallace Plas. | $\eta$ Inh. | Isocyanate Used |
|---|---|---|---|---|
| Control | 23 | 20.0 | 1.55 | None |
| Do | 24 | 19.5 | 1.50 | (1) |
| C | 25 | 29.3 | 1.72 | (2) |
| D | 29 | 31.5 | 1.74 | (3) |

[1] 16 ml. of .047 normal phenyl isocyanate solution (in tetrachloroethylene).
[2] 16 ml. of .052 normal toluene diisocyanate solution (in tetrachloroethylene).
[3] 16 ml. of .050 normal isocyanate solution described in Example II.

As can be seen, the mono-isocyanate had no effect on the resultant bulk and solution viscosities whereas the di- and tri-isocyanates increased the bulk and solution viscosities.

Since many other embodiments of this invention will occur to those skilled in the art, the scope of this invention is defined solely by the appended claims and should not be construed as limited to the specific embodiments disclosed hereinabove.

What is claimed is:

1. In a process for making hydrocarbon polymers of monomers comprising α-olefins having from 2 to 18 carbon atoms by contacting and polymerizing said monomers in a polymerization vessel with an organo-soluble coordination catalyst, said catalyst comprising the reaction product of a hydrocarbon-soluble titanium or vanadium compound and an organometallic reducing agent dissolved in a solvent selected from liquid hydrocarbons and liquid halogenated hydrocarbons, and terminating the polymerization reaction by adding to the polymerization vessel at least one equivalent of Zerewitinoff-active hydrogen compound for each equivalent of the said titanium or vanadium compound and for each equivalent of the said organometallic reducing agent and recovering a normally solid hydrocarbon polymer from the reactive medium, the improvement which consists of adding, prior to the addition of the Zerewitinoff-active hydrogen compound, an organic polyisocyanate in an amount sufficient to supply from 20 to 60 parts by weight of isocyanate groups for each gram atom of vanadium or titanium present in the polymerization vessel.

2. Process of claim 1 in which said organic polyisocyanate is toluene diisocyanate.

3. Process of claim 2 in which the said coordination catalyst is a mixture of vanadium trisacetonyl acetonate and diisobutyl aluminum chloride.

4. Process of claim 3 in which said monomers are ethylene, propylene and 1,4-hexadiene.

References Cited

UNITED STATES PATENTS

| 3,147,313 | 9/1964 | Hsieh | 260—837 |
| 3,203,944 | 8/1965 | Hsieh | 260—94.3 |
| 3,281,383 | 10/1966 | Zelinski et al. | 260—23.7 |
| 3,350,362 | 10/1967 | Potts et al. | 260—77.5 |

FOREIGN PATENTS

| 698,636 | 11/1964 | Canada. |
| 710,402 | 5/1965 | Canada. |
| 985,614 | 3/1965 | Great Britain. |

DONALD E. CZAJA, Primary Examiner

M. J. WELSH, Assistant Examiner

U.S. Cl. X.R.

260—80.78, 94.9